STEEL SHELVING
Original Filed April 24, 1968 2 Sheets-Sheet 1
FIG. 1
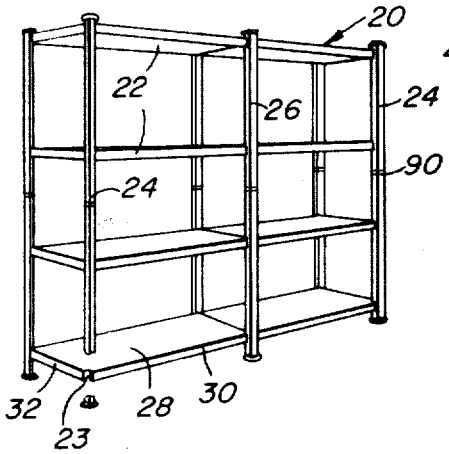
FIG. 2
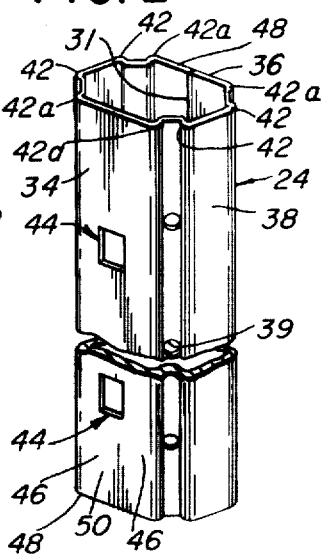
FIG. 3b
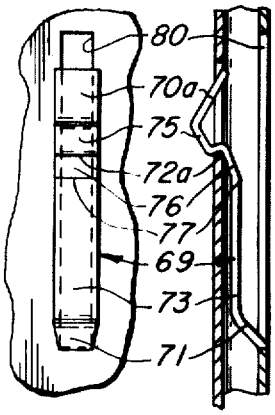
FIG. 3c
FIG. 3A
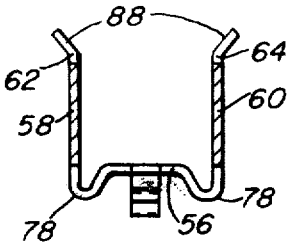
FIG. 4
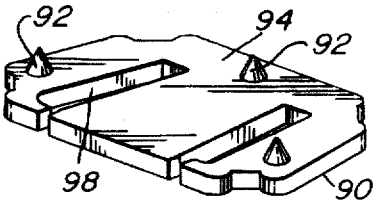
FIG. 5
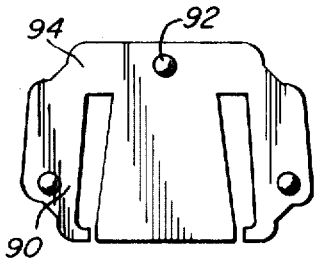
FIG. 3
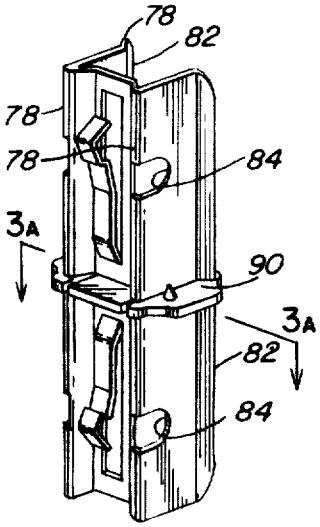
FIG. 7
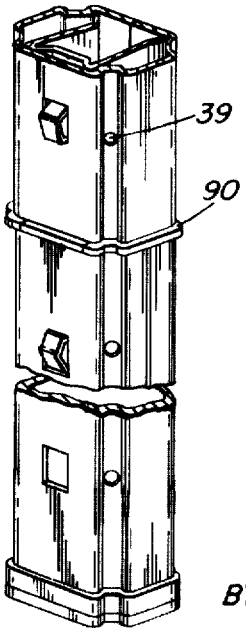
FIG. 6
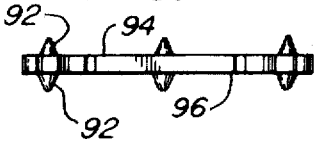
INVENTORS
IRWIN J. FERDINAND
IRWIN R. KULBERSH
BY Harbaugh & Thomas
ATTY'S

STEEL SHELVING

Original Filed April 24, 1968 2 Sheets-Sheet 2

INVENTORS
IRWIN J. FERDINAND
IRWIN R. KULBERSH
BY Harbaugh & Thomas
ATTY'S

United States Patent Office

Re. 27,200
Reissued Oct. 26, 1971

27,200
STEEL SHELVING

Irwin J. Ferdinand, Glencoe, and Irwin R. Kulbersh, Morton Grove, Ill., assignors to Hirsh Company Original No. 3,480,155, dated Nov. 25, 1969, Ser. No. 723,691, Apr. 24, 1968, which is a continuation-in-part of Ser. No. 691,545, Dec. 18, 1967. Application for reissue Jan. 19, 1970, Ser. No. 3,250
Int. Cl. A47f *5/00*
U.S. Cl. 211—148 24 Claims

Matter enclosed in heavy brackets [ ] appears in the original patent but forms no part of this reissue specification; matter printed in italics indicates the additions made by reissue.

ABSTRACT OF THE DISCLOSURE

Light weight steel shelving in which short sections of corner posts are snap assembled by the customer in end-to-end relationship and held in alignment and against separation by a connector with a molded pad cammed into place between the ends in weight bearing relationship. The connection accommodates various shaped posts and comprises an elongated generally U-shaped spring element bridging the joined ends and is provided with camming shouldered spring actuated detents which, upon insertion and advancement into the ends of post sections, spring inwardly of the walls of the post sections until the shouldered detents snap into shouldered apertures in the post walls in interlocking relationship therewith against rectilineal separation. A single post assembly can be disassembled individually either by slight relative rotation without damage to the posts but when assembled as a corner post in shelving is held against relative twisting and performs as an integral member or, tiered shelving can be separated as units by spring detents engaging in either of the two abutting post sections present at each corner of the shelving. Provision is also made with the connector for decor panels posts and nested leveling pads on the bottom of the posts for stabilizing the shelving.

CROSS REFERENCE TO RELATED APPLICATIONS

This application is a continuation-in-part of the application Ser. No. 691,545 filed Dec. 18, 1967, now abandoned and the invention relates in part to U.S. Pat. No. 3,255,722 issued June 14, 1966 to Ferdinand et al.; application Ser. No. 597,344 filed Nov. 28, 1966, *now U.S. Pat. No. 3,392,689 issued July 16, 1968 to* Ferdinand et al.; application Ser. No. 623,027 filed Mar. 14, 1967, *now U.S. Pat. No. 3,438,344 issued Apr. 15, 1969 to* Ferdinand et al.; and application Ser. No. 668,433 filed Sept. 18, 1967 [by] *now Pat. No. 3,479,975 issued to* Ferdinand et al.

BACKGROUND OF THE INVENTION

Knockdown shelving for customer assembly is shown in the above cross references, wherein the individual upright corner posts are from five to six feet, or longer, as standard length for supporting five or six shelves. Provision is made for rapidly and rigidly securing the shelves in place on the posts and for adjusting the shelf levels after assembly if desired. Although endeavors have been made to provide short post sections that can be assembled end-to-end as shown in said [application Ser. No. 597,344] *Pat. No. 3,392,689* it is more satisfactory from a customer relations viewpoint for the manufacturer to assume the burdens of packaging long integral vertical supports with the shelves rather than burden the customer with less than a completely satisfactory assembly of post sections. For these reason, shelving shipped in disassembled condition generally has single unit upright supports of the full length desired to reach from the floor to the topmost shelf.

It will be observed from the cross references that it is highly desirable that an assembled shelving unit have rugged corner posts and shelves rigidly connected thereto against sway for sustaining rather heavy loads for extended periods of time and for handling, lifting, shifting and levelling the shelving with ease. When posts are made of assembled sections they must have the rigidity, strength, pleasing appearance and versatility of an integral post with respect to forces in both a vertical and horizontal direction. Any provision for assembly of the parts introduces potential areas where rigidity may be lacking or weakness incurred.

Earlier endeavors to provide assembled posts either provide posts readily secured by rectilinear telescoping movement but without securement against being again pulled apart, or involve the extensive use of nuts and bolts for the tedious assembly by inexperienced customers. If they are to be disassembled the reverse process is equally tedious. In some instances shelf securing elements support the post joint at least in part and when the shelf is changed, the post assembly is temporarily weakened or permanently left weakened if a replacement securing means is not supplied.

SUMMARY OF THE INVENTION

It is an object of the present invention to provide a post assembly which can be readily assembled merely by a telescoping rectilineal movement of the parts to establish an interlock which cannot be dis-assembled by forces acting in the opposite direction, yet can be readily dis-assembled individually by relative twisting rotational forces or a spring latch release. However, when assembled as part of shelving the posts operate as integral elements yet will permit level adjustment of the shelves without being weakened, and except for intentional use of a spring latch in one embodiment of limited exposure cannot be disassembled by forces acting in any direction. The present invention is further characterized by having the advantages of integral posts of conventional length in that each shelving unit can be handled and lifted at any one or more posts for levelling and shifting the shelving without an upper section separating from a lower section. The selves at any level may also serve as gripping elements at the posts for handling the shelving.

A further object of the invention is to provide a decor panel sectional post construction which has a particularly desirable radius of gyration for strength and pleasing appearance when assembled in shelving.

The present invention contemplates a post connector and post sections having at least three parallel lines of interengagement under radial stress. Preferably a thin molded pad of hard plastic interengages the ends of the post sections so that they embed slightly therein to secure them against relative horizontal shifting when under a vertical load. Because of a more favorable radius of gyration the parallel lines of engagement are preferably four in number and equally spaced. The connector comprises an elongated substantially U-shaped member or spring metal and the post is a rolled tubular post of a generally octagonal cross-section as shown in two embodiments, in which the edges are rolled closed under stress to remain closed. A further embodiment relates to a decor panel post modification. In all of these there are four equally spaced corners with work-hardened bordering metal and one side that is bordered by two of the corners having detent receiving apertures adjacent opposite ends.

The back of the connector may be disposed to bridge the rolled edges of the post under some strain in which case the edges of the connector engage the two opposing back wall post corners under opposing forces exerted against the edges of the connector. The post and connector can be disposed otherwise with a latch element interconnecting the two backs with appreciable space between their center portions. The same relation of forces is also preserved, except in the decor panel post and connector where their backs are disposed against each other with the opposing forces at the post edges exerted towards each other.

The back of the connector has outwardly shear formed detents spaced from each other with shoulders of both facing each other. The posts adjacent their ends are clean punched to provide shoulders mating with and engaging the connector shoulders to prevent rectilineal disassembly of the post sections after they have been once telescoped a certain distance onto the connector. A small space is provided between the ends of the posts which is occupied by the weight bearing molded washer or pad, the connector being notched out to receive and secure the pad in its correct position.

Another feature of the invention is that the connector and pad combination is very simple to understand and assemble correctly. Its corner ends are finger compressed to enter the open ends of the post sections, and assembly is completed by pushing the post sections as far as they will go because the interlocking shoulders will permit this. With the intermediate pad in place, the assembly is complete. A unified post is formed which shares the rigidity of a one-piece post of the same overall length. If the intermediate pad was overlooked, the assembly can be easily disassembled by a relative rotation or spring detent urging and the omission corrected. Thereafter, once two or more assembled posts are secured to shelves, relative rotation is prevented thereby and the shelving is as though it were made with integral posts, or two integrated assembled units.

DESCRIPTION OF THE DRAWINGS

One or more preferred embodiments of this invention are described in relation to the various drawings, wherein like numerals refer to like parts:

FIG. 1 is a front perspective view of an assembly of shelves and upright supports embodying the improvements of this invention;

FIG. 2 is a fragmentary perspective view of the two end portions taken from the front side of one form of upright support that can be used in accordance with this invention;

FIG. 3 is a side perspective view of one form of pad and connector sub-assembly of this invention;

FIG. 3A is a sectional view of the connector taken on line 3a in FIG. 3;

FIG. 3B is a plan view of the shear formed detent means shown in FIGS. 2 and 3;

FIG. 3C is a side view, partly in section of the shear formed detent means shown in FIG. 3B;

FIGS. 4, 5 and 6 are perspective, plan and edge views, respectively, of one form of pad elements of this invention;

FIG. 7 is a side view in partial section showing the subassembly of FIG. 3 connecting two of the supports in FIG. 2 in abutting relationship with a pair of nested leveling units at the bottom or foot of the unitized post;

THE PREFERRED EMBODIMENT

Figure 14:
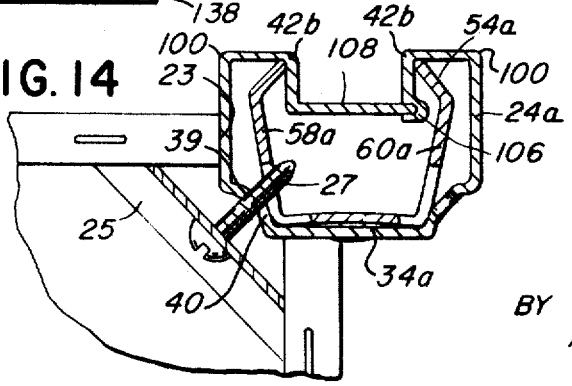
FIG. 14 is a cross-sectional view similar to FIG. 13 showing another embodiment of a decor panel post.

Referring more particularly to FIG. 1 there is shown an assembled shelving unit 20 comprising a plurality of individual shelves 22 which are roll-formed from coated sheet metal in a manner described in Handler 3,304,760 for the purposes described in the related cases referred to herein. Briefly, each of the four corners of the shelves 22 are notched out as at 23 to receive and be rigidly secured to supporting corner posts 34, and to intermediate posts 26 as more particularly described in Patent No. 3,255,722 and application Ser. No. 668,433 and represented in FIG. 14. Each of the shelves 22 has a generally rectangular top surface 28 and contiguous depending peripheral side flanges 30 and end flanges 32. As represented in FIG. 14 the flanges abut flat sides of the post as drawn into rigidifying squaring contact therewith by a cross-corner bracket 25 and a tension member 27 interconnecting the bracket 25 and post 24a. The general arrangement shown in FIG. 1 of the upright supports and shelves is fabricated in accordance with this invention. The upright supports are made in half length sections approximately the length of the shelves whose notches enable nesting for ease in packaging, shipping, handling and assembly, and the sections are constructed and assembled as herein described into units long enough to provide the post shown in FIG. 1.

The posts 24 and 26 are generally identical and may be of any tubular construction and may have a variety of cross-sectional configurations generally square, rectangular or hexagonal. A preferred form of the post 24 is shown in FIG. 2 which is essentially hexagonal with four major relationship and the minor walls are in the nature walls cross-sectionally defining a rectangle or square of recessed mitered corners. The major sides can be identified as the front wall 34, back wall 36 and the side walls 38, the back wall 36 being the wall where the two edges 31 of the rolled strip abut, preferably under pressure. The minor walls 40 join the major walls at work hardened form lines 42, each preferably defining an internally acute angle. The form lines 42a border the front and back walls 34 and 36 and provide the corners engaged by the connector as hereinafter described. The end edges 48 of the post are square-cut perpendicular to the longitudinal axis of the post section.

Figure 11:
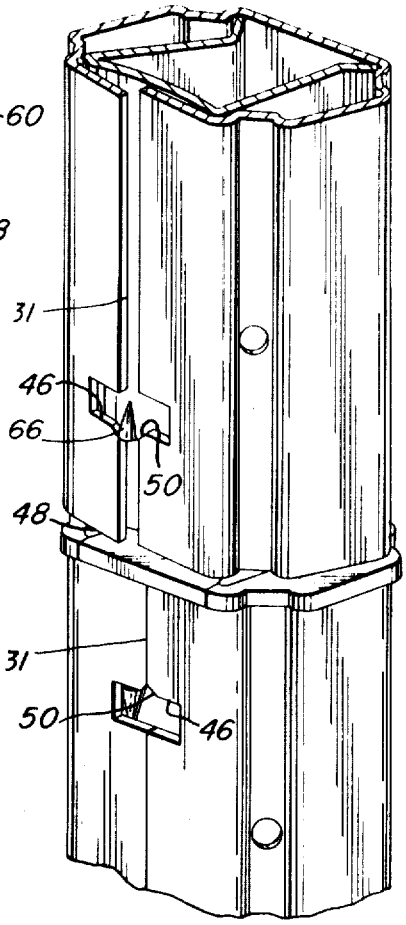
FIG. 11 is a perspective view of the assembled post of FIG. 9 twisted to dissassemble the part.
Figure 12:
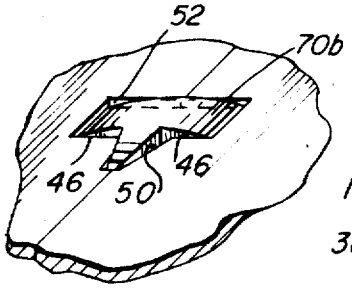
FIG. 12 is a fragmentary perspective view of an embodiment of a T-slot-T detent locking joints modification embodying the invention to show the interlocking edges.

A cross-slot 44 is provided in the front or back wall 34 or 36 a predetermined distance from each end 48, same being cut across the edges at 31 when in the back wall to present a narrow elongated opening which can be referred to as a T-slot in FIG. 11 having spaced shoulders 46 facing away from the post ends 48 and divided at the edges 31 by a notch 50 extending towards the ends. The notches may be of several shapes as shown in FIGS. 11 and 12. But they are characterized by shoulders 46 facing away from the adjacent end 48 and a notch addition 50 extending towards the ends, it being optional if weight bearing shoulders 52 are utilized facing the ends as shown in FIG. 12. The predetermined distance from the end surface 48 of each post section 24 is a measurement related to the shoulders 46 so that the shoulders are invariably engaged as later described at the time two such post sections are joined by a connector so that the assembled post sections can serve as integral units with vertically spaced openings 39 in the minor walls 40 to receive the fastening elements 27 at selected shelf heights.

FIGS. 8, 9, 10 and 11 show one form of connector 54 for use in accordance with this invention, same having an elongated substantially flat wall 50 bordered by edges 78 with depending opposed walls 58 and 60 extending therefrom and each having diverging flanges 62 and 64 along the length of the connector. These parts form a substantially U-shaped channel and is preferably formed of steel having a fair degree of resilience so that the walls 58 and 60 along with the flanges 62 and 64 can be pressed or sprung toward each other sufficiently, by hand pressure, for insertion into the open end 48 of a post 28 section in an orientation described.

A pair of oppositelyy facing T-shaped raised detents 66 and 68 are shear-formed in the flat wall 56 of the connector 54. The dimensions and shape of the detents 66 and 68, as well as their spacing along the wall 56 both longitudinally and laterally are essentially important in this invention. Each detent has a cam contour 70 rising from the external face of the wall 56 to a shear-cut raised shoulder 72 facing towards the middle of the connector body so that the shoulders 70 of the two detents face each other. It will be observed in FIG. 10 that these detents are located to one side of the center line of the wall 56.

The connector 54 has corners 78 and flange edges 82 which engage the four corners 42a of the post section. The walls 58 and 60 converge toward each other from the base wall 56 and the flanges 62 and 64 diverge in FIGS. 3 and 8 whereas in FIGS. 13 and 14, the walls 58a and 60a diverge and the flanges 62a and 64a coverge. Intermediate between the detents 66 and 68, notches 86 are provided in the corners 78 and 80 and notches 88 are provided in the edges 82. The notched corners and edges 86 and 88 are in the same plane and cut with their top and bottom edges substantially perpendicular to the axis of the connector 54.

The shear formed detents disclosed in FIGS. 3, 3a, 3b and 3c are spring supported. In this embodiment the flat wall 56 is recessed appreciably below the level of the edges 78 and comprise a single blade 69 bent outwardly at its base to provide a short support portion 71 that disposes a flexing portion 73 slightly below the level of the edges 78. The flexing portion has a shoulder portion 72a terminating in two oppositely inclined portions, an insertion cam 70a and a release cam 75 which when the spring is in operative position engaging in a cross slot 44 extends through and above the cross slot where they can be manually contacted and depressed when desired to release the shoulder.

The shoulder 72a is of a height slightly greater than the thickness of the metal forming the recess 44 and defines with its supporting element portion 76 of the flexing portion 73 an obtuse angle. To provide the shoulder with its proper resting position, the supporting element portion 76 is bent as at 77 to dispose the shoulder at a level above the edges 78 and disposed at an acute angle to the plane of the wall 34 having the cross slot 44 in it.

With some exaggeration for explanation purposes in the showing of the spacing between the spring detent elements illustrated in FIG. 3c, it is to be understood that the composite off-set height of the elements 71 and 76 is just enough to locate the shoulder above the level of the edges 78 and the composite height of the peak of the opposite inclines 70a and 75 above the plane of the flexing member 73 is slightly less than the depth of recessing of the wall 56 so that the flexing member is free to flex enough for the inclines to clear the post wall 34 with which they cooperate.

It is to be noted however as illustrated in FIG. 3B that the blade 60 is wider than the slot 80 from which it is cut. This is accomplished by shearing the metal outwardly and the appreciable clearances between the dies where the vector line is at an angle whereby the slot 80 is the size of the male die which is smaller than the die opening and the formed member is of the size of the die opening which is larger than the male die; marginal metal flowing slightly into the clearance space as the pressure of the shearing edges peaks just prior to molecular separation in the direction of die movement. This provides marginally rounded edges for manual engagement and actuation alone, and an interference relationship which prevents spring damage when the connector spring 73 is being manually depressed for release.

Referring to FIGS. 3, 4, 5 and 6, there is shown a plastic pad or washer 90 having upper and lower flat surfaces 94 and 96 defining an essentially rectangular configuration with the surfaces 94 and 96 extending therearound continuously on the four sides except for an appreciable lateral deflection at the slots 98 away from the central portion. The flat surfaces have guide elements received within the ends of the post sections comprising conical cam-like protuberances 92 thereon. The slots 98 engage the walls 58 and 60 with the remainder of the pads received in notches 86 and 88 to provide adequate guidance and anchorage for the pads between the section ends 48 when assembled.

The pads 90 are formed of tough resilient plastic or firm rubber having a sufficient body and resistance to compression to sandwich firmly between the opposing edges 48 of the post sections as will be described. Moreover, the pads 90 are sufficiently flexible to be sprung open and assembled in place as described around the connector 54 in the manner shown in FIG. 3, with the slots 98 encompassing the outer surface of the connector, and engaged at and between the corner and edge notches 96 and 98.

The manner of using the connector of this invention has become apparent from this description. A pad 94 and connector 54 are assembled as shown in FIG. 3. One end of the connector is squeezed and forced inside the top open end 48 of one post section 24 with the flat wall 56 adjacent either to the front or split wall 36 as described in the several embodiments. The arms are pressed inwardly so that the guide elements 92 are received within the post end 48. In FIGS. 8 to 11 the cam 70 of the detent 68 engages the split wall 36 and springs it outwardly to permit the detent to reach the T-slot 44 whereupon the split wall springs back and shoulders 46 and 72 interlock. The other post section is then similarly pressed over the other end of the connector until its T-slot 44 passes into locking relationship onto the detent 68 and its shoulder 72 interlocks with shoulder 46.

In FIGS. 2 to 7, the blade 69 is pressed inwardly to assure clearances for entry of the cam 70a which then flexes and slides along the inside of the wall 34 and springs outwardly into the cross-slot when reached for the engagement by the shoulder 72a of the slot edge or shoulder 46.

Figure 9:
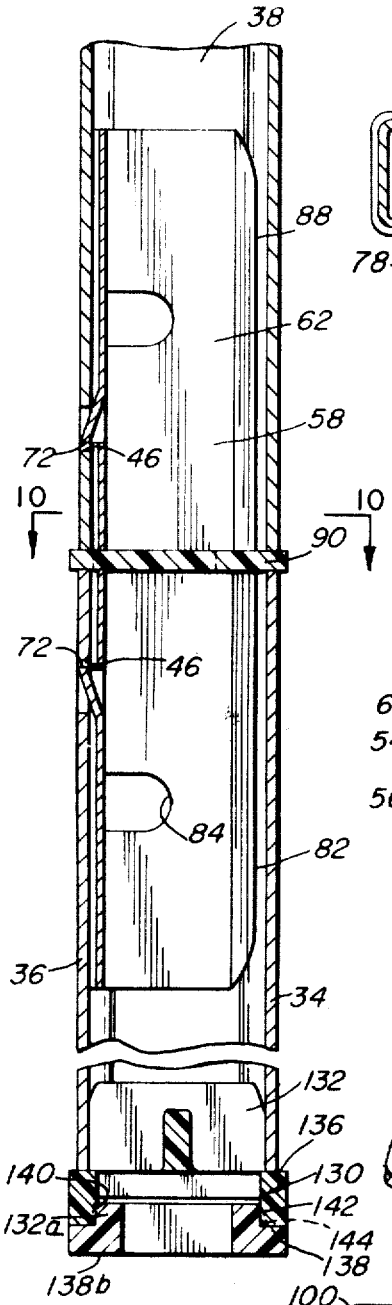
FIG. 9 is an enlarged cross-sectional view showing the connection of two supports by the connector shown in FIG. 8 and pad shown in FIG. 4 with nested leveling units at the foot of the unitized post.
Figure 10:
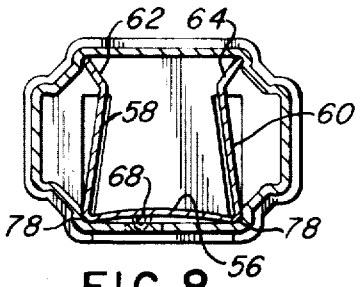
FIG. 10 is an enlarged cross-sectional view taken upon line 10—10 of FIG. 9.

The final assembly is shown in FIGS. 9 and 7, respectively, where the ends 48 rest against pad 90 in weight bearing relation with an edge portion of the pad 90 extending outwardly as a trim, and the assembled sections are held against pulling apart by the shoulders 72 and 46 or shoulders 72a and 46 in the respective embodiments.

Assuming, however, that a customer has performed the assembly prescribed but inadvertently left out the pad 90. Referring to FIG. 11, it will be observed that the two post sections can be disassembled by one being twisted rotatively by hand in one direction and the other twisted in the other direction. In the example shown the upper post has been twisted clockwise, the split 31 has separated to receive the detent 66 again and with a little wiggling the post sections separate. The pad is then supplied and reassembly made. Once the assembled posts are assembled with shelves to make shelving, the shelves and posts in this embodiment cooperate to prevent any twisting and therefore the assembled posts in shelving perform as rigid integral units.

In FIG. 7, the post assembly cannot be separated without intentionally depressing the spring elements and with this embodiment upper sections can be removed for use on other lower sections of like construction or interchangeable with other embodiments described, or as separate shelving units by themselves.

In FIG. 12, the T-slots are modified whereby the detent portion defining the shoulders 46 upon twisting provide a rotational cam 70b which releases for disassembly from either a modified T-slot (FIG. 8) or a squared T-slot (FIG. 12).

It will also be noted that with the predetermined spacing of shoulders 72 and 72a and the slot shoulders 46, the connectors 36 can be apertured quite accurately in the corners 78 as at 84 (FIGS. 3 and 8) at the same level as the fastener receiving openings 39 so that shelves can be located at any height without disturbing the rigidity and ruggedness of the assembled post sections.

Figure 13:
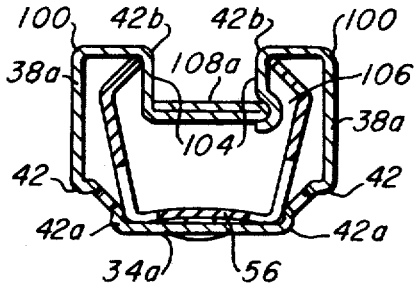
FIG. 13 is a sectional view showing a decor post with a connector embodying the invention.

Reference is now made to FIGS. 13 and 14 wherein the shape of the intermediate post 26 (FIG. 1) can be modified to provide a novel recessed panel construction which gives the appearance of two posts side-by-side, it being appreciated that this post can also be used for end posts if desired if any possibility of adding further shelving later might be involved.

In the embodiments shown in FIGS. 13 and 14 the uninterrupted wall 34a is treated as the back wall and the front wall is divided into two coplanar horizontally spaced vertical walls 102 which, with the parallel side walls, provide square corner constructions as at 100. Between these walls 102 the metal is roll-formed inwardly to provide squared corners 42b and the facing panels 104 which give a visual depth to the post. The facing panel on one side terminates in a longitudinal groove 106 opening towards the opposite one of the walls 104 while the opposite one of the walls is roll-formed to provide a forwardly facing inner wall portion 108 which can be of single thickness as shown in FIG. 14 whose edge is received in said groove 106, or a double thickness of reversely folded wall portions 108a as shown in FIG. 13 where the fold line is received in the groove 106 with the free edge exposed.

The posts of the invention are pre-coated and the embodiment of FIG. 13 is provided with different colors on the opposite faces of the strip rolled. It will be observed that in FIG. 14 the color of all exposed walls will be the same whereas in FIG. 13 the recessed panel wall will be the other of the two colors, thereby providing a panel color contrast on the front walls.

Figure 8:
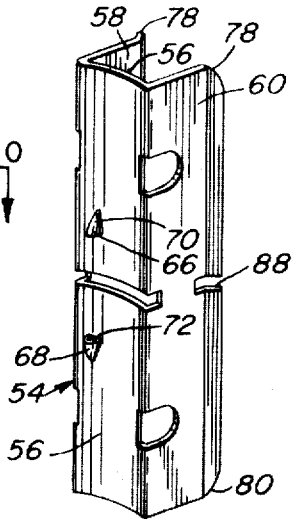
FIG. 8 is a side perspective view of another form of connector to be used in accordance with this invention.

In this embodiment, as already mentioned the connector 54a has diverging side walls 58a and 60a and converging flanges 62a and 64a with detent means of either FIG. 3 or of FIG. 8 in the wall 56. The corners 78 slidingly engage the form line corners 42a while the edges 82 of the flanges 62a and 64a engage to form line corners 42b under a compressive action urging the inner wall portion 108 into firmer engagement with the groove 106. In this instance the connector and the pad are constructed and arranged as described in connection with FIGS. 3 and 8, the outer contour being changed to follow the outer contour of the post so that the panel recess is continuous throughout the length of the assembled post.

FIG. 9 shows annular or doughnut-shaped plastic foot or leveler members 130 having upstanding elements 132 frictionally received at the bottom end of the posts 24 and 26 where they are engaged and held essentially by the walls 34 and 36. The elements 132 are deep insert elements essentially H-shaped with the sides interengaging the post walls 34 and 36. The leveler members have a peripheral flange portion 136 extending beyond the perimeters of the post ends and following their contours engages the end edges 48 of the post section in weight bearing relation as shown in FIG. 9. The bottom portion of the flanges have a flat surface 138 to engage the floor surface and a recess 140 is provided in the underside which is the same size and shape as the base 132 so that two or more levelers 130 can be nested one upon the other in the manner shown in FIG. 9 to bring all of the bottom ends into a common plane of an irregular floor during installation. The outer surfaces 142 of the upstanding elements 132a have cam ribs 144 on them to tighten the telescoping relation which the upstanding elements 132 have with the post walls and recesses 140 with whichever they ultimately become associated.

Thus, it will be observed how the post sections, shortened for shipping convenience, can be easily assembled together and to shelves to become integrated post elements whereby the assembled shelving can be lifted by the top of the posts and the feet or leveler members inserted and adjusted, and the shelving installed in proper place with no danger of post separation, yet shelves can be adjusted as to level at any time without weakening the posts and the shelving can be disassembled and reassembled with minimum trouble or experience.

Having described the present invention and several embodiments thereof, it will be observed how the operation and objects are attained and how further changes can be made without departing from the spirit of the invention, the scope of which is commensurate with the appended claims.

What is claimed is:

1. In a sheet metal shelving assembly:

(a) a supporting post composing a pair of separate elongated hollow sections of substantially the same cross-sectional configuration, each having matching internal corners defined by a confining wall;

(b) said confining wall of said sections having a flat portion extending from and along one of said corners to abuttable ends of said sections;

(c) an aperture through each of said flat wall portions a predetermined distance from said ends;

(d) an elongated connector within said hollow sections of said post having longitudinal edges engaging said internal corners in said matched relationship, and holding said ends in contiguous aligned relationship with said wall portions in substantially the same plane;

(e) said connector having an outer wall portion adjacent and parallel to the plane of said wall portions of said sections; and (f) a pair of outwardly depending spring detent elements in said outer wall portion adapted to engage said apertures and maintain the aligned relationship of said sections.

2. A sheet metal assembly in accordance with claim 1 in which:

(a) said apertures in said wall portions having longitudinally spaced opposing inner edges;

(b) said spring detents have longitudinally spaced outer edges; and (c) the inner edges of said apertures engaging the outer edges of said spring detents in a snap-fit relationship to hold said post sections upon said connector.

3. A sheet metal assembly in accordance with claim 1 in which:

(a) said confining wall is roll formed from a single metal sheet and said wall portions of said sections comprise inwardly depending coplanar flat elongated flanges with their marginal edges in spaced opposed relationship therealong;

(b) said apertures are formed across said marginal edges and have longitudinally spaced opposing inner edges thereacross; and (c) said spring detents have longitudinally spaced outer edges adapted to be engaged between the inner edges of said apertures.

4. A sheet metal assembly in accordance with claim 1 in which:

(a) a resilient spacer is provided in abutting relationship between the aligned ends of said hollow sections.

5. A sheet metal assembly in accordance with claim 1 in which:

(a) said hollow sections have four internal corners; and (b) said connector is an elongated U-shaped member with said longitudinal edges along resilient opposed flanges thereof disposed in a pair of said internal corners.

6. A sheet metal assembly in accordance with claim 1 in which:

(a) said aperaures in said flat wall portions of said sections have intersecting longitudinal and transverse openings; and (b) said spring detent elements have intersecting longitudinal and transverse raised portion adapted to fit within said apertures.

7. A sheet metal assembly in accordance with claim 1 including:

(a) a leveler member having a raised top and a concave bottom adapted to be inserted into and under the bottom of said support with said raised portions and said concave portions being of the same shape and size whereby a second leveler can be placed under said first leveler with its raised portion in nested relationship with said concave portion of said first leveler.

8. In a knockdown sheet metal shelving assembly (a) a plurality of roll formed cross sectionally polygonal upright supporting posts having a plurality of major sides having four parallel form-rolled substantially right angle corners of a substantially rectangular figure; and (b) at least two spaced *narrow* minor sides disposed at a right angle to each other and [intergral] *integral* with two right angle corners and having vertically spaced openings therein paired at identical levels for supporting shelves at different levels;

(*c*) *said openings being of a size threadedly receiving fastening element and said minor sides joining the major sides along work hardened form lines in close proximity to the openings to oppose stresses exerted axially outwardly around said openings.*

9. The combination called for in claim 8 including:

(a) a connector *having* [saving] three cross-sectional leg portions defining two corners engaging two adjacent right angle corners of each of two supporting posts terminally disposed in alignment with each other; and (b) two edges parallel with the two corners engaging the remaining right angle corners under opposing pressure.

10. The combination called for in claim 9 in which:

(a) said supporting posts have recesses spaced from their ends with shoulders facing from said ends; and (b) said connector having detents with shoulders opposing said recess shoulders in engagement therewith against rectilineal disassembly when the adjacent ends of aligned posts are disposed in a predetermined weight bearing relationship with respect to each other.

11. The combination called for in claim 10 in which:

(a) said predetermined relationship is a spaced one; and (b) including pad means carried by said connector intermediate its ends disposed in said spaced between the spaced ends of the aligned posts in weight bearing relationship.

12. The combination called for in claim 8 in which:

(a) two of said major sides are spaced and coplanar and have inwardly directed rolled flanges forming two of said right angle corners and walls defining a recess between them; and (b) said flanges terminating in interengaging edges defining a recessed panel between the walls.

13. The combination called for in claim 12 in which:

(a) one of said engaging edges is reversely bent upon itself to expose the reverse face side thereof between said walls.

14. The combination called for in claim 8 including:

(a) a U-shaped connector having two acute angle corners engaging two of said right angle corners, two marginal edges engaging the other two corners under opposed pressure and a recessed face portion interconnecting the first mentioned two right angle corners; and (b) a shear formed spring blade cut longitudinally from said recessed face and having a spring portion extending towards the end of the connector and terminating in an oppositely inclined cam section defining a shoulder facing away from said end and supported above the level of said acute angle corners by the spring member in tension.

15. In a knockdown sheet metal shelving assembly:

(a) a roll-formed octangular upright supporting post having four form-rolled substantially right angle corners defining the corners of a rectangular figure; and (b) four minor sides each contiguous with one of said corners and, [having vertically spaced means in] at least two of said minor sides *defining recessed mitered corners* disposed at right angles to each other *and having vertically spaced means* paired at identical levels for releasably supporting shelves in *vertically* rigid relationship.

16. The combination called for in claim 15 including:

(a) a U-shaped connector having two acute angle corners engaging two of said corners and two marginal edges engaging the other two corners under opposing pressure; and (b) means interlocking said connector with either end of said supporting post a spaced distance therefrom against rectilineal movement after insertion a predetermined distance with the end of said post end.

17. In a knockdown sheet metal shelving assembly:

(a) a plurality of roll-formed cross-sectional polygonal upright supporting posts two of which have a plurality of major sides with at least two parallel corners defining between them aligned major sides having cross-slots therein spaced a predetermined distance from their adjacent ends;

(b) a connector bridging said ends and having two corners engaging said parallel corners and defining a recessed wall between them overlapping said aligned major sides;

(c) two oppositely directed spring blades carried by the recessed wall each having a shoulder defining an acute angle with respect to said wall with the two shoulders facing towards each other and with the blade portions beyond the shoulders terminating in convex cams, the terminal end portions of the cams, and said shoulders extending above the level of said connector corners for engagement in said cross slots.

18. The connector called for in claim 17 having recesses through the connector corners at their mid-point; and (a) including a pad received in supported relation in said recesses disposed in weight supporting abutting relationship between the ends of said posts and having guide protuberances on its opposite faces engaging the inside wall edges of said posts in guided relation.

19. In a knockdown sheet metal shelving assembly, an upright supporting post of roll-formed strip metal having (a) a pair of spaced major wall portions disposed at a right angle to each other, and (b) a minor wall portion disposed diagonally between and joining adjacent edges of the major wall portions along work hardened form lines defining internal [angels] *angles,*

(c) said minor wall portion *being in the nature of a recessed mitered corner between said form lines* receiving apertures therethrough.

20. The shelving assembly called for in claim 19 in which [said minor wall portion defines a recessed mitered corner between said form lines, and] said angles are work hardened internally acute angles.

21. The shelving assembly called for in claim 19 in which a second minor wall portion interconnects one of said major wall portions and a third major wall portion parallel with the other of said pair of major wall portions.

22. The combination defined in claim 8 in which said two right angle corners define narrow wall portions at each of the two right angle corners disposed diagonally to and joining said major sides at the corners along work hardened form lines.

*23. The combination called for in claim 8 in which said minor sides are recessed.*

*24. A shelving assembly called for in claim 19 in which said receiving apertures are of a size to interengage a threaded fastener element.*

References Cited

The following references, cited by the Examiner, are of record in the patented file of this patent or the original patent.

UNITED STATES PATENTS

| | | | |
|---|---|---|---|
| 1,952,111 | 3/1934 | Bales | 108—107 |
| 2,950,826 | 8/1960 | Degener | 211—148 |
| 3,199,471 | 8/1965 | Orsi | 211—148 X |
| 3,255,722 | 6/1966 | Ferdinand | 248—250 X |
| 3,278,043 | 10/1966 | Kimpton | 211—148 |
| 3,352,584 | 11/1967 | Engel | 211—148 X |

NILE C. BYERS, Jr., Primary Examiner

U.S. Cl. X.R.

108—107; 248—250

PO-1050
(5/69)

UNITED STATES PATENT OFFICE

CERTIFICATE OF CORRECTION

Patent No. RE 27,200 Dated October 26, 1971

Inventor(s) IRWIN J. FERDINAND et al

It is certified that error appears in the above-identified patent and that said Letters Patent are hereby corrected as shown below:

Column 4, line 35, in the specification, change "hexagonal" to --octagonal -- line 36, in the specification, change "hexagonal" to -- octagonal -- line 37, in the specification, delete " relationship and the minor walls are in the nature"

line 38, in the specification, after "square" insert -- relationship and the minor walls are in the nature --

Column 10, line 69, in Claim 19, after "lines" insert -- and having fastener --

Signed and sealed this 12th day of December 1972.

(SEAL)
Attest:

EDWARD M. FLETCHER, JR.
Attesting Officer

ROBERT GOTTSCHALK
Commissioner of Patents